United States Patent [19]
Youn

[11] Patent Number: 5,917,695
[45] Date of Patent: Jun. 29, 1999

[54] NOTEBOOK PERSONAL COMPUTER HAVING A SPEAKER COVER STRUCTURE

[75] Inventor: Jae-Sam Youn, Suwon, Rep. of Korea

[73] Assignee: SamSung Electronics Co., Ltd., Suwon, Rep. of Korea

[21] Appl. No.: 08/888,153

[22] Filed: Jul. 3, 1997

[30] Foreign Application Priority Data

Jul. 3, 1996 [KR] Rep. of Korea ................ 96 26824

[51] Int. Cl.⁶ ................................................. H05K 5/00
[52] U.S. Cl. ........................ 361/683; 345/905; 381/87; 381/388
[58] Field of Search ................................ 381/340, 182, 381/24, 345, 87, 333, 336, 388, 300; 361/681, 683, 685, 686, 680, 687; 345/905

[56] References Cited

U.S. PATENT DOCUMENTS

| | | |
|---|---|---|
| 4,719,322 | 1/1988 | Guzik et al. . |
| 5,138,526 | 8/1992 | Chung Hsiang . |
| 5,400,214 | 3/1995 | Antonuccio et al. . |
| 5,448,495 | 9/1995 | Liu . |
| 5,502,460 | 3/1996 | Bowen . |
| 5,519,572 | 5/1996 | Luo . |
| 5,576,930 | 11/1996 | Kuo et al. . |
| 5,583,743 | 12/1996 | Levins et al. . |
| 5,623,391 | 4/1997 | Chase et al. . |
| 5,668,882 | 9/1997 | Hickman et al. ........................ 381/300 |

*Primary Examiner*—Richard A. Hjerpe
*Assistant Examiner*—Francis Nguyen
*Attorney, Agent, or Firm*—Robert E. Bushnell, Esq.,

[57] ABSTRACT

A notebook personal computer having a speaker cover structure, in a notebook personal computer having a liquid crystal display, a main body and hinges, is made up of a speaker cover formed radially and having a plurality of fixing hooks in upper and lower parts thereof to be mounted in predetermined grooves; and a top-housing having speaker holes formed at both portions of fixing portions of hinges to direct the sound from a speaker, mounted inside a main body, to the outside, and speaker cover fixing grooves for mounting the speaker cover and formed at both portions of the speaker holes. A user can listen to the sound of the speaker clearly since the shapes of both portions of the fixing portions of the hinges are formed at a slanted angle in designing the top-housing and the speaker cover formed radially is mounted on the fixing hooks, to direct the sound from the built-in speaker toward the user.

15 Claims, 2 Drawing Sheets

NOTEBOOK PERSONAL COMPUTER HAVING A SPEAKER COVER STRUCTURE

CLAIM OF PRIORITY

This application makes reference to, incorporates the same herein, and claims all benefits accruing under 35 U.S.C. §119 from an application for A NOTEBOOK PERSONAL COMPUTER HAVING A SPEAKER COVER STRUCTURE earlier filed in the Korean Industrial Property Office on Jul. 3, 1996 and there duly assigned Ser. No. 26824/1996.

1. Field of the Invention

The present invention relates to a notebook personal computer (PC) having a speaker cover structure. More particularly, the present invention relates to a notebook PC having a speaker cover structure which directs a sound from a speaker, mounted on a main body of a notebook PC, toward a user.

2. Description of the Related Art

The use of audio speakers driven by general purpose computers is notede in, for example U.S. Pat. No. 5,519,572 for Computer Peripheral Apparatus to Luo and U.S. Pat. No 5,623,391 for a Speaker Cover and Snap-In Coupling Therefor to Chase et al. These patents disclose speakers used in personal or mainframe computers. The use of speakers in notebook or laptop computers has, I have found, been hindered by the requirements of space and power required by a pair of audio frequency speakers. Moreover, to date, I have found that contemporary designs have not been able to reliably incorporate stereo speakers into the body of the housing for laptop or notebook computers.

SUMMARY OF THE INVENTION

Accordingly, it is an object to provide a laptop or a notebook computer with speakers.

It is also an object to provide a laptop or notebook computer with the speakers located within the housing.

It is yet another object to provide a laptop or notebook computer with the speakers located inside the hinge between the cover and the main body.

It is still another object to provide a laptop or a notebook computer where the speakers are pointed directly at the user allowing the sound to travel directly to the user's ears from the laptop or notebook computer.

To achieve the objects and in accordance with the purpose of the invention, as embodied and broadly described herein, a notebook PC having a speaker cover structure, in a notebook personal computer having a liquid crystal display for displaying a picture image, a main body for processing input/output data or a program and hinges for mechanically connecting the main body and the liquid crystal body, is made up of a speaker mounted near a hinge in the main body and for outputting a sound, a main body cover for covering the main body and having a hole for mounting the speaker and a speaker cover mounted in the hole of the main body cover and for covering the speaker.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 3:
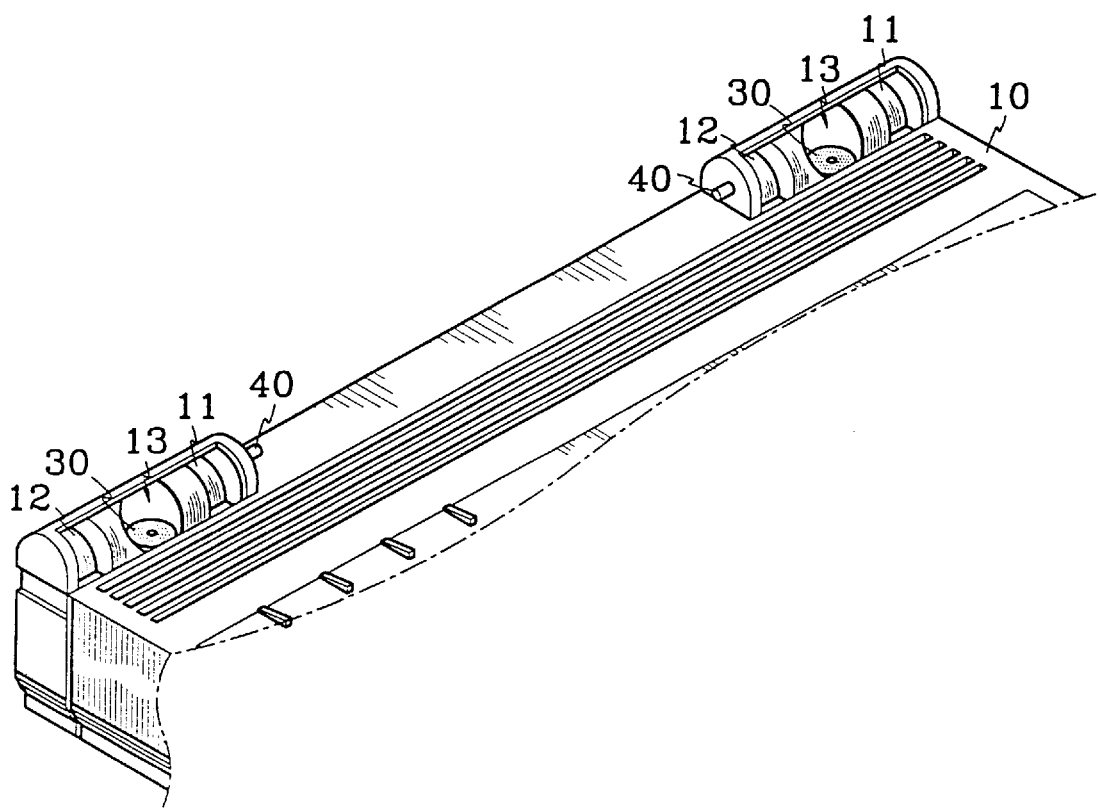
FIG. 3 is a partial perspective view of a notebook PC having a speaker cover structure according to a preferred embodiment of the present invention.
Figure 4:
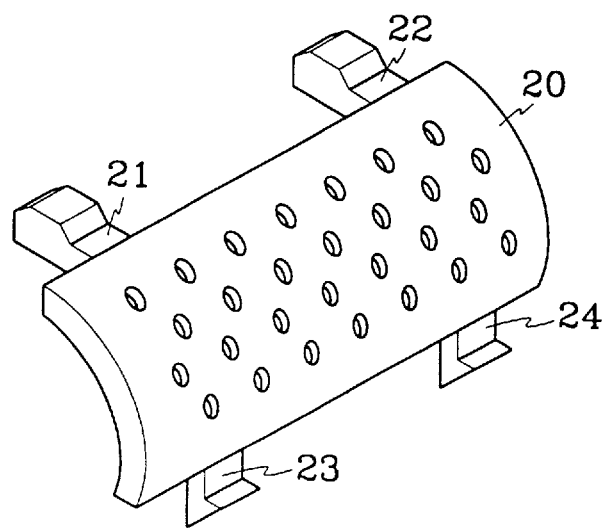
FIG. 4 is a perspective view of a speaker cover according to a preferred embodiment of the present invention.

Referring to FIGS. 3 and 4, a notebook personal computer (PC) having a speaker cover structure according to a preferred embodiment of the present invention, in the notebook PC having a liquid crystal display, a main body and hinges, made up of a speaker cover 20 formed radially and having a plurality of fixing hooks 21 to 24 in upper and lower parts thereof to be mounted on predetermined grooves, and a top-housing 10 having speaker holes 13 formed at both portions of fixing portions of hinges 40 to direct the sound from a speaker 30, mounted inside a main body, to the outside, and speaker cover fixing grooves 11 and 12 for mounting the speaker cover 20 and formed at both portions of the speaker holes 13. Upper fixing hooks 21 and 22 of the speaker cover 20 are supporting hooks designed to support the top-housing 10 using an elastic force, and lower fixing hooks 23 and 24 are wedge-shaped, whereby they are hooks which serve as latches to the top-housing 10.

The operation of the notebook PC having a speaker cover structure according to the preferred embodiment of the present invention is as follows. The process for mounting the speaker cover 20 on the notebook PC is explained. First, the speaker holes 13 are formed at both portions of the fixing portions of the hinges 40 to direct the sound from the speaker 30 to the outside. The fixing grooves 11 and 12 are for fixing the speaker cover 20 to both portions of the speaker holes 13. The speaker cover 20 is mounted by inserting the fixing hooks 21 to 24 of the speaker cover 20 into the fixing grooves 11 and 12.

Figure 1:
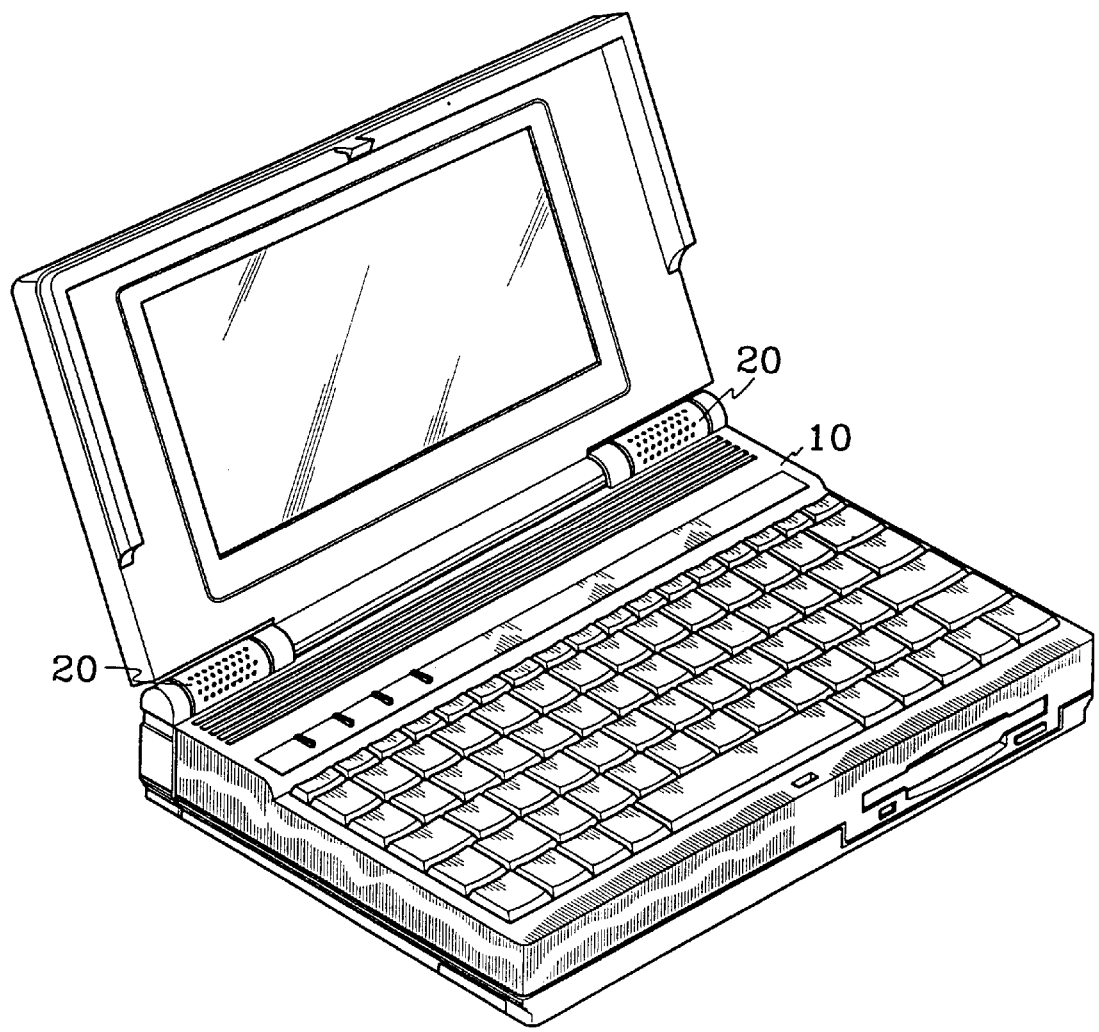
FIG. 1 is a perspective view of a notebook PC having a speaker cover structure according to a preferred embodiment of the present invention.

Referring to FIG. 1, the shapes of both portions of the fixing portions of the hinges 40 are formed at a slanted angle in designing the top-housing 10 and the speaker cover formed radially is mounted on the fixing hooks 21 to 24, to direct the sound from the built-in speaker 30 toward the user. Accordingly, a sound wave may radiate at a proper angle for the user to sense since the speaker cover 20 is mounted on the top-housing 10 at a predetermined angle.

Figure 2:
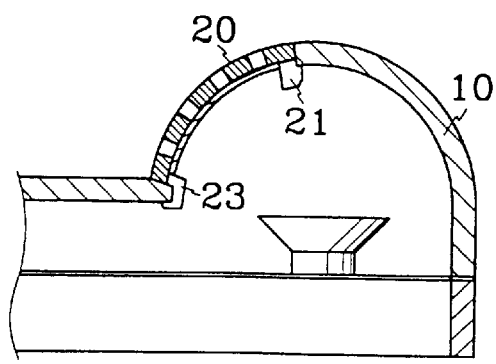
FIG. 2 is a side view of a notebook PC having a speaker cover structure according to a preferred embodiment of the present invention.

That is, referring to FIG. 2, the speaker cover 20 may be mounted at a slant on the top-housing 10 at a predetermined angle since the fixing hooks 21 to 24 are jointed with the top-housing 10 through the fixing grooves 11 and 12. Accordingly, the effect of the notebook PC having a speaker structure according to the preferred embodiment of the present invention lies in that the user can listen to the sound of the speaker clearly since the notebook PC has the additional speaker cover.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A notebook computer, comprising:
   a main body bearing a keyboard and enclosing a central processing unit that processes data;
   a lid containing a liquid crystal display for displaying a plurality of picture images varying under the control of said keyboard and said central processing unit;
   a hinge rotatably connecting said lid to said main body, said hinge having a body with an exterior surface and a hollow interior;
   a speaker mounted directly under said hinge in said main body with a portion of said speaker protruding into said hollow interior of said hinge; and
   a speaker cover detachably mounted on said body of said hinge, thus maintaining a fixed orientation relative to said main body while said lid rotates around said hinge, and enclosing said hollow interior of said hinge.

2. The notebook computer of claim 1, comprised of said speaker cover having a plurality of hooks extending from an upper portion of said speaker cover and engaging said body of said hinge.

3. The notebook computer of claim 2, with said speaker cover further comprising a second plurality of hooks extending from a lower portion of said speaker cover to engage said body of said hinge, said second plurality of hooks having a wedge-shape.

4. The notebook computer of claim 3, with said speaker cover being positioned on said body of said hinge to direct the sound from said speaker toward a user of said notebook computer.

5. A notebook computer, comprising:
   a main body enclosing a central processing unit and bearing a keyboard;
   a first cover containing a display unit providing a plurality of visual images varying under the control of said central processing unit;
   a hinge rotatably connecting said first cover to said main body as said first cover travels between an open position relative to said keyboard and a closed position with said first cover in juxtaposition with and obstructing access to said keyboard, said hinge having a body and a cavity;
   a speaker disposed directly under said hinge in said main body; and
   a speaker cover detachably mounted on said body of said hinge while enclosing said cavity and covering said speaker.

6. The notebook computer of claim 5, further comprised of a portion of said speaker protruding into said cavity of said hinge.

7. The notebook computer of claim 6, with said speaker cover being positioned on said body of said hinge to direct the sound from said speaker toward a user of said notebook computer, regardless of the position of said first cover.

8. The notebook computer of claim 7, with said speaker cover having a plurality of hooks extending from an upper portion of said speaker cover for engaging said body of said hinge.

9. The notebook computer of claim 8, with said speaker cover having a second plurality of hooks extending from a lower portion of said speaker cover to engage said body of said hinge, said second plurality of hooks having a wedge shape.

10. A notebook computer, comprising:
    a housing containing a central processing unit;
    a cover pivotally attached to said housing and containing a display device;
    a hinge pivotally connecting said cover to said housing, said hinge having a body enclosing a hollow interior; and
    a speaker mounted under said hinge in said main body.

11. The notebook computer of claim 10, further comprised of said speaker protruding into said hollow interior of said hinge.

12. The notebook computer of claim 11, further comprising a speaker cover detachably engageable with said body of said hinge to enclose said hollow interior of said hinge.

13. The notebook computer of claim 12, with said speaker cover having a plurality of hooks extending from an upper portion of said speaker cover for engaging said body of said hinge.

14. The notebook computer of claim 13, with said speaker further comprising a second plurality of hooks extending from a lower portion of said speaker cover to engage said body of said hinge, said second plurality of hooks having a wedge-shape.

15. The notebook computer of claim 14, further comprised of said speaker cover being positioned on said body of said hinge to direct the sound from said speaker toward a user of said notebook computer.

* * * * *